United States Patent [19]
Stadtfeld

[11] Patent Number: 5,839,943
[45] Date of Patent: Nov. 24, 1998

[54] METHOD OF AND APPARATUS FOR TRUING CUTTER HEADS

[75] Inventor: Hermann J. Stadtfeld, Rochester, N.Y.

[73] Assignee: The Gleason Works, Rochester, N.Y.

[21] Appl. No.: 698,834

[22] Filed: Aug. 16, 1996

Related U.S. Application Data

[60] Provisional application No. 60/003,401, Aug. 31, 1995.
[51] Int. Cl.⁶ ........................................ B24B 3/06
[52] U.S. Cl. .................... 451/8; 451/48; 73/104
[58] Field of Search .......... 451/8, 9, 48, 5–28; 73/104, 865.8

[56] References Cited

U.S. PATENT DOCUMENTS

| | | | |
|---|---|---|---|
| 3,641,431 | 2/1972 | Pigage et al. | 324/61 R |
| 4,525,108 | 6/1985 | Krenzer | 407/22 |
| 4,575,285 | 3/1986 | Blakesley | 407/115 |
| 4,621,954 | 11/1986 | Kitchen et al. | 407/22 |
| 4,816,729 | 3/1989 | Carlson | 318/568 |
| 5,297,055 | 3/1994 | Johnstone | 364/474.37 |
| 5,335,454 | 8/1994 | Ilek et al. | 451/9 |
| 5,377,454 | 1/1995 | Pedersen et al. | 451/5 |
| 5,525,094 | 6/1996 | Pallmann | 451/45 |

OTHER PUBLICATIONS

Advertising Brochure—"Gleason, No. 563 Cutter Inspection Device", The Gleason Works, Rochester, New York, Apr. 1993.

Primary Examiner—Robert A. Rose
Attorney, Agent, or Firm—Robert L. McDowell; Ralph E. Harper

[57] ABSTRACT

A method of truing cutting tools of the type comprising a plurality of stick-type cutting blades releasably secured in a cutter head, the cutting blades having a cutting edge and a cutting side relief surface oriented at a predetermined relief angle. The method comprises mounting a cutting tool to the spindle of a truing apparatus having a cutting tool spindle and a measuring probe with the probe capable of being moved along a first direction defining probe offset travel and along a second direction defining in/out feed motion of the probe. The cutting side relief surface of the cutting blade is positioned with respect to the probe whereby the cutting side relief surface is substantially parallel to the direction of probe offset travel. The cutting side surface of the cutting blade is probed and the position reading is recorded. The recorded position is compared with a predetermined position, and (a) if the recorded position is within a pre-set tolerance range of the predetermined position, the cutting tool is indexed to another cutting blade, or, (b) if the recorded position is outside of a pre-set tolerance range of the predetermined position, the position of the cutting blade in said cutter head is axially adjusted by an amount to reposition the cutting side within the pre-set tolerance range.

11 Claims, 6 Drawing Sheets 5,839,943

1

METHOD OF AND APPARATUS FOR TRUING CUTTER HEADS

CROSS-REFERENCES TO RELATED APPLICATIONS

This application claims the benefits of provisional application, Ser. No. 60/003,401, filed Aug. 31, 1995.

FIELD OF THE INVENTION

The present invention is directed generally to cutting tools for cutting bevel and hypoid gears having curved flanks. In particular, the present invention is directed to a method and apparatus for truing cutter heads containing stick-type cutting blades.

BACKGROUND OF THE INVENTION

In the manufacture of bevel and hypoid gears with curved flank lines, the cutting tools utilized are primarily face mill or face hob cutters, such types of cutting tools are well known in the art of gear manufacture. In face mill cutters the cutting blades are arranged in the cutter head such that one tooth slot is formed with each plunge of the cutter and the cutter must be withdrawn and the workpiece indexed to the next tooth slot position in order to form the next tooth slot. In face hob cutters, cutting blades are arranged in the cutter head such that with a single plunge of the cutting tool, and accompanying rotation of the workpiece in a timed relationship with the cutting tool, all tooth slots of the workpiece are formed.

Cutting tools for face mill and face hob processes usually consist of disk-shaped cutter heads with stick-type cutting blades, made from bar stock tool steel for example, which are inserted and positioned in slots formed in the cutter heads. Each cutting blade comprises a front rake face, cutting edge, a cutting side surface oriented at a predetermined relief angle, clearance edge, clearance side surface, and a top surface. Examples of inserted stick-type cutter heads and blades are shown in U.S. Pat. Nos. 4,575,285 to Blakesley and 4,621,954 to Kitchen et al.

The disk-shaped cutter head body is divided into blade groups or "starts" with each blade group containing one to three slots. In the case of one slot per group, the cutter is dedicated to cut only the convex or concave tooth flanks of a workpiece. Such cutters are usually employed in finishing operations. In the case of two slots per blade group, there is an inner and outer cutting blade located in each group. Such a cutter head can be designed as a roughing cutter, a finishing cutter, or a "completing" cutter which roughs out the tooth slot and finishes convex and concave tooth flanks at the same time. In the case of three slots per blade group, the additional cutting blade is a "bottom" or roughing blade. The bottom blade can be arranged as an inner or outer blade (convex or concave cutting, respectively). With this shape, the third blade reams out the root fillet of the tooth slot and supports the cutting action of one of the two other blades.

To have each blade of one kind, especially inner or outer blades, producing the same chip thickness and therefore having the same load and wear, the radial location of the cutting edge is most important. Tolerances of the blade shank and the cutting edge location relative to the shank as well as tolerances of "wear" of the slots in the cutter head can add up. In one known cutter building procedure, the blades are moved axially against a surface or "stop" which results in uniform blade height on the cutter head. However, this procedure controls just one dimension and does not account for the influence of the effected tolerances mentioned above on the radial location of the cutting edges of the blades. The effect is a non-uniform cutting action from blade to blade resulting in cutting flats on the tooth surface and a shorter cutter life as well as a dynamically less-than-optimal machine operation.

In an effort to control the radial location of the cutting edge of a blade, a radial position check of a significant point along the cutting edge may be performed using a manually operated cutter building/inspection device such as, for example, the machine described in "No. 563 Cutter Inspection Device" published by The Gleason Works, Rochester, N.Y. The end point of each blade is brought into contact with a blade stop to axially position all blades to a uniform height with respect to the cutter head. The cutting edge of each blade is then contacted with a probe to determine the radial location of a same predetermined point on each cutting edge. The radii differences between the blades are used to calculate a value to move the blades up or down in the slot of the cutter head thereby effecting a radial shift in the position of the cutting edge with the result being all cutting edges following essentially the same path as the cutter is rotated about its axis. The axial location uniformity of the end point of the cutting blades is lost due to the axial adjustment necessary to effect the cutting edge shift however, the blade tips usually remain within pre-set tolerances. Truing a cutter on this type of machine is very time consuming and the accuracy is highly dependent upon the ability of the operator to consistently and accurately position the probe on the cutting edge of each blade.

Another type of existing apparatus for building and measurement of cutter heads is a non-indexing apparatus which provides a probe movable in a plane containing the cutter axis and operates by contacting the probe with the cutting side surface of a stick-type blade. Once contact is made, the cutter is slowly rotated to effect movement of the probe end ball along the cutting side surface toward the cutting edge which results in the position of the probe moving away from the cutter axis as the probe ball approaches the cutting edge. Movement of the probe away from the cutter axis is monitored until a maximum reading is noted which indicates the radial location of the cutting edge. The position of the probe is compared to a predetermined or theoretical reading and, if necessary, a new blade stop position is calculated and the axial position of the cutting blade is adjusted to reposition the cutting edge to a desired radial position. This procedure is very sensitive to cutter rotation errors as well as errors in positioning the probe ball.

In an effort to remove errors due to placement of a probe ball against a cutting edge, a non-contacting type capacitance probe has been utilized to eliminate measurement errors associated with the methods discussed above. Such a non-contact probing method is disclosed by Pigage et al. in U.S. Pat. No. 3,641,431. However, this approach is not without its disadvantage since it is still necessary to "find" the cutting edge by slowly rotating the cutter while monitoring the output reading of the probe.

Yet another type of cutter building and measuring apparatus comprises an indexing mechanism which allows control of the angular (rotational) position of the cutter and provides indexing from one blade to the next. Along with the indexing capability, the apparatus also includes means to effect a probe offset which is necessary to correctly orient the probe at the cutting edge perpendicular to the motion direction of the cutting blade. As with the other methods discussed above, this procedure is also highly sensitive to misalignment of the cutter angular position and placement of the probe against the cutting edge.

It is an object of the present invention to provide a process of measuring the radial position of a cutting blade without the necessity to contact the cutting edge of the cutting blade.

It is a further object of the present invention to provide a larger probe contact region on a cutting blade while at the same time providing a process which more accurately measures the radial positions of cutting blades positioned in a cutter head.

SUMMARY OF THE INVENTION

The present invention is directed to a method of determining the radial position of at least one stick-type cutting blade projecting from a surface of a cutter head with the cutting blade having a cutting edge, a cutting side relief surface oriented at a relief angle, a clearance side relief surface oriented at a relief angle, and a front face oriented at a rake angle.

The method comprises providing an apparatus having a cutter spindle and a measuring probe capable of movement in a first direction defining probe offset travel and in a second direction defining in/out probe feed movement. The cutter is mounted to the spindle and a surface of the cutting blade is positioned substantially parallel to the probe offset travel direction. The surface is then probed and the position reading of the blade surface is recorded.

More particularly, the present invention is directed to a method of truing cutting tools of the type comprising a plurality of stick-type cutting blades releasably secured in a cutter head, the cutting blades having a cutting edge and a cutting side surface oriented at a predetermined relief angle.

The method comprises mounting a cutting tool to the spindle of a truing apparatus having a cutting tool spindle at least one probe capable of being moved in a first direction defining probe offset travel and a second direction defining in/out probe feed motion. The cutting side relief surface of the cutting blade is positioned substantially parallel to the probe offset travel direction. The cutting side relief surface is probed to determine a position of the cutting side and the position is recorded. The recorded position is compared with a predetermined position, and (a) if the recorded position is within a pre-set tolerance range of the predetermined position, the cutting tool is indexed to another cutting blade, or, (b) if the recorded position is outside of a pre-set tolerance range of the predetermined position, the position of the cutting blade in said cutter head is axially adjusted by an amount to reposition the cutting side within the pre-set tolerance range.

Preferably, the probe is positioned perpendicularly with respect to the lengthwise and profile directions of the cutting side relief surface of the cutting blade, or, the probe is positioned perpendicularly with respect to the cutter axis.

DETAILED DESCRIPTION OF THE PREFERRED EMBODIMENT

The present invention will now be discussed in detail with reference to the accompanying drawings. In all figures, like elements are referenced with the same reference numbers.

Figure 2:
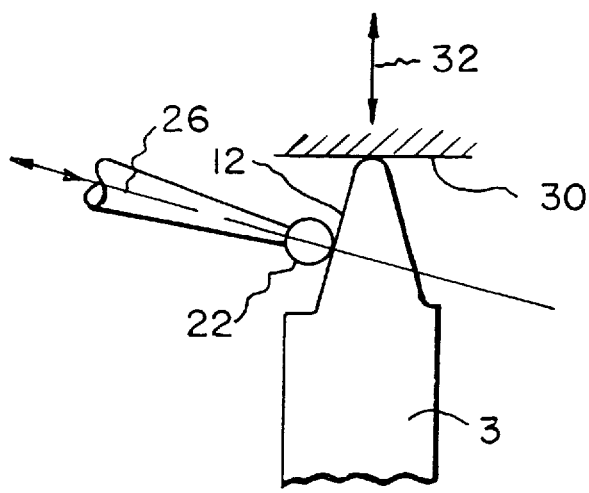
FIG. 2 is a view taken along the surface of the cutter head of FIG. 1 showing the probe in contact with the cutting edge of the cutting blade.
Figure 1:
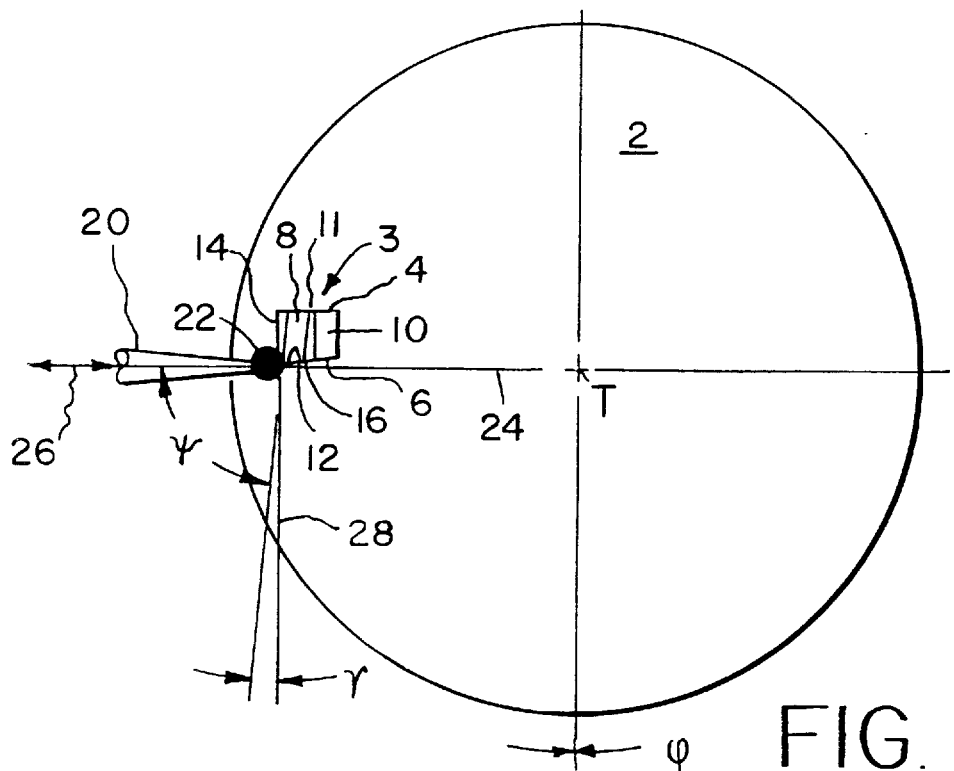
FIG. 1 illustrates a prior art method of measuring the radial position of cutting blades on a face mill cutter.

FIG. 1 illustrates a known procedure for radially truing an inserted blade face mill cutter. For discussion and illustration purposes in the drawing figures, only one cutting blade 3 is shown projecting from the front face of cutter head 2, however, it is to be understood that for actual cutting purposes, a plurality of stick-type blades would be projecting from the front face of cutter head 2. Stick blade 3 (FIG. 2) comprises back face 4, front rake face 6, cutting side relief surface 8, clearance side relief surface 10, and top relief surface 11. A cutting edge 12 is formed at the intersection of front rake face 6 and cutting side surface 8. Cutting blade 3 is positioned in a cutter head slot 14 in which the front surface 16 lies essentially on the radius of the cutter head 2.

Cutter head 2 is mounted to the spindle of a cutter measuring/inspecting machine such as the aforementioned Gleason No. 563 Inspection Machine. The measuring machine also includes a contact probe 20 having a probe end ball 22 and a blade stop 30. The probe 20 is movable toward and away from cutter axis T in an axial plane 24 containing cutter axis T. Arrow 26 illustrates movement of probe 20 toward axis T.

As previously discussed, the end point of each blade is brought into contact with the blade stop 30 (FIG. 2) to axially position all blades to a uniform height with respect to the cutter head 2. The cutter is then rotated to position cutting blade 3 adjacent to probe ball 22, the rotating being effected by manual means such as a handwheel on the measuring machine. Once cutting blade 3 is adjacent probe ball 22, the probe is moved inwardly along direction 26, toward tool axis T, until contact is made with the cutting blade side surface 8 at some point along the height of the cutting blade. Cutter 2 is then rotated to relatively move probe ball 22 toward the cutting edge 12 thus causing movement of the probe 20 in a direction opposite to that shown by arrow 26. Due to the relief angle γ of cutting side surface 8 (which is the angle between the instant direction of cutting motion 28 and cutting side surface 8) and its orientation with respect to probe 20, as the cutter is rotated probe 20 moves along direction 26 and reaches its maximum distance from tool axis T at the cutting edge 12 which is the position shown in FIG. 2. It is at this position that the position of the probe is recorded as indicating the radial position of the cutting blade 3.

In face milling cutters, the instant direction of cutting 28 is perpendicular to the cutter radius which lies within plane 24. Since cutting direction 28 is perpendicular to plane 24, it is also perpendicular to the direction of in/out probe movement 26. The angle between cutting side surface 8 and the probe 20 is shown by ψ which, therefore, is equal to 90-γ.

The position of the probe 20 at the point along the cutting edge 12 is noted and compared with a desired position and if the actual reading is outside of a predetermined tolerance range, a new blade position is calculated, blade stop 30 is repositioned in the appropriate direction 32 to the new position and the cutting blade 3 is brought into contact with the repositioned blade stop 30. Movement of the cutting blade 3 axially up or down (with reference to FIG. 2) with respect to its original position in cutter head 2 effects a radial shifting of the cutting edge 12 away from or toward the tool axis T.

The same procedure is repeated for all like blades (e.g. inside blades or outside blades) with the end result being all like blades following essentially the same path in the cutting process. However, this measuring and truing process is time consuming, very sensitive to the angular position φ of the cutter, and relies heavily on the skill of the operator to accurately position the probe 20 directly on the cutting edge 12.

Figure 3:
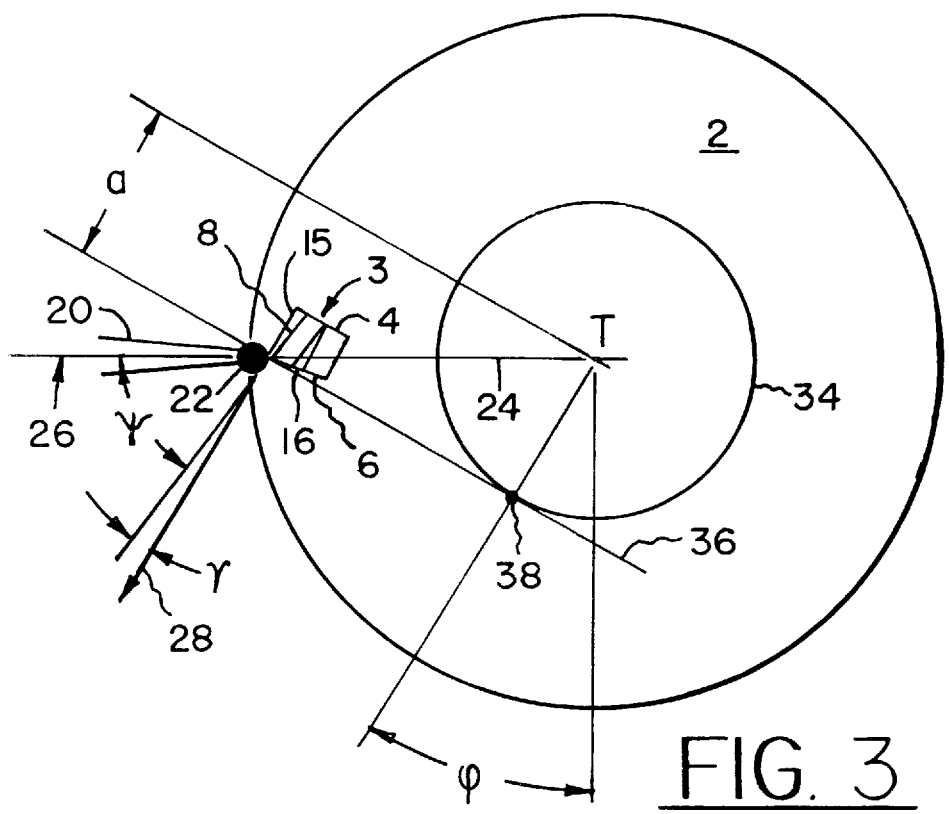
FIG. 3 illustrates a prior art method of measuring the radial position of cutting blades on a face hob cutter.

FIG. 3 depicts a prior art method of measuring the radial position of cutting blade on a face hob cutter with the measuring taking place in the axial plane 24 containing the tool axis T and the direction of probe movement 26. Unlike face mill cutters, in which the instantaneous direction of cutting 28 is perpendicular to the cutter radius (FIG. 1), the direction of cutting 28 at any moment on a face hob cutter is perpendicular to a cycloid radius 36 with its origin at point 38 (tangent point of radius 36 and cutter base circle 34). This is because of the offset "a" of the blade 3 in the cutter head 2 (which is almost identical with the offset of the blade slot 15 in the cuter head 2). The position of the cutting blade in FIG. 3 effectively represents a shift in the angular position of the cutter equal to φ relative to a cutter angle of φ=0 in FIG. 1. This shift in cutter angle presents both the cutter side relief surface 8 and front rake face 6 of the cutting blade at significantly greater angles with respect to the direction of probe travel 26 than is seen in the face mill cutter configuration of FIG. 1 and therefore renders the face hob arrangement even more sensitive to misalignment of the cutter angular position and inaccurate placement of probe ball 22 on the cutting edge 12.

Figure 4:
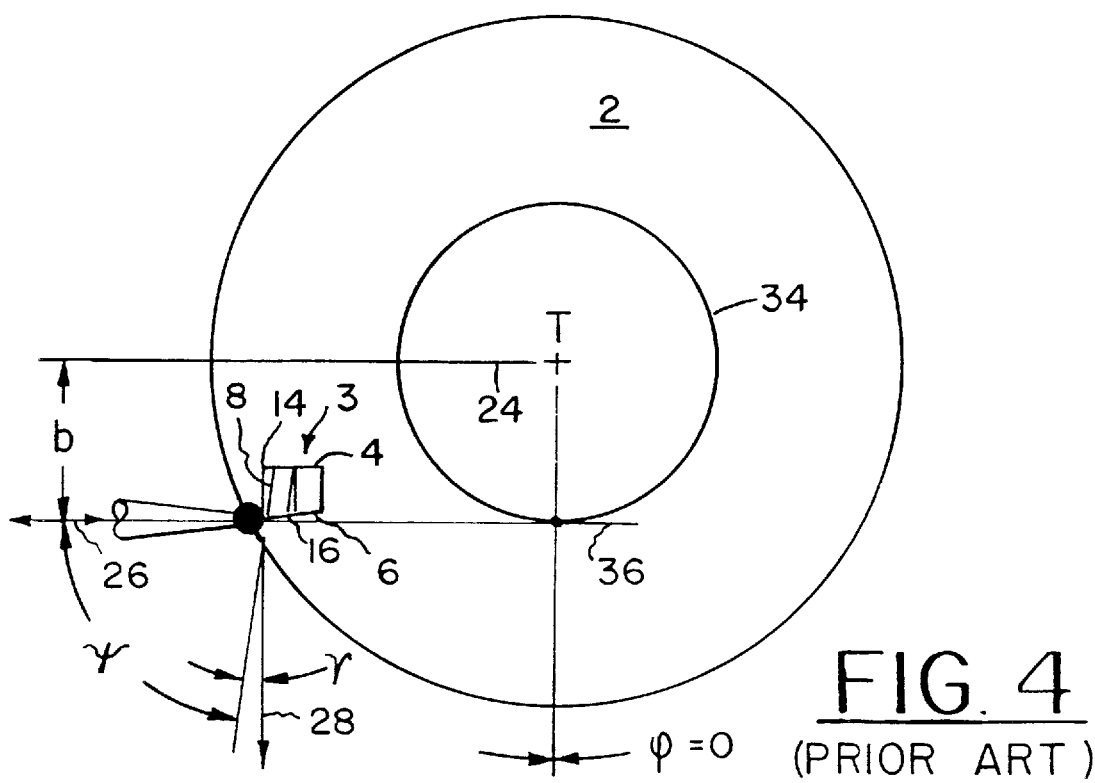
FIG. 4 illustrates a prior art indexing and offset method for measuring the radial position of cutting blades on a face hob cutter.

FIG. 4 is another prior art arrangement for measuring the radial position of cutting blades on a face hob cutter. In this arrangement, the measuring/inspection apparatus is equipped with blade indexing and offset capabilities. The indexing capability allows for control of the angular position of the cutter head 2 (φ=0 in FIG. 4) and provides indexing from one blade to the next like blade. This type of apparatus is also equipped with a freedom to move the probe 20 in an offset direction "b".

With the apparatus of FIG. 4, a cutting blade is indexed to a position where instantaneous cutting direction 28 is perpendicular to the cutter radius contained in axial plane 24, that is, a position where cycloid radius 36 is parallel to plane 24. With the cutting blade in this position it is necessary to move probe 20 from its position in axial plane 24 (as shown in FIG. 3) by an offset amount "b" to a new position for movement along cycloid radius 36 in order to contact cutting edge 12 at some point along its height. In this instance, sensitivity to misalignment of the cutter rotation angle and probe offset is comparable to that discussed above with reference to FIG. 1.

Figure 5:
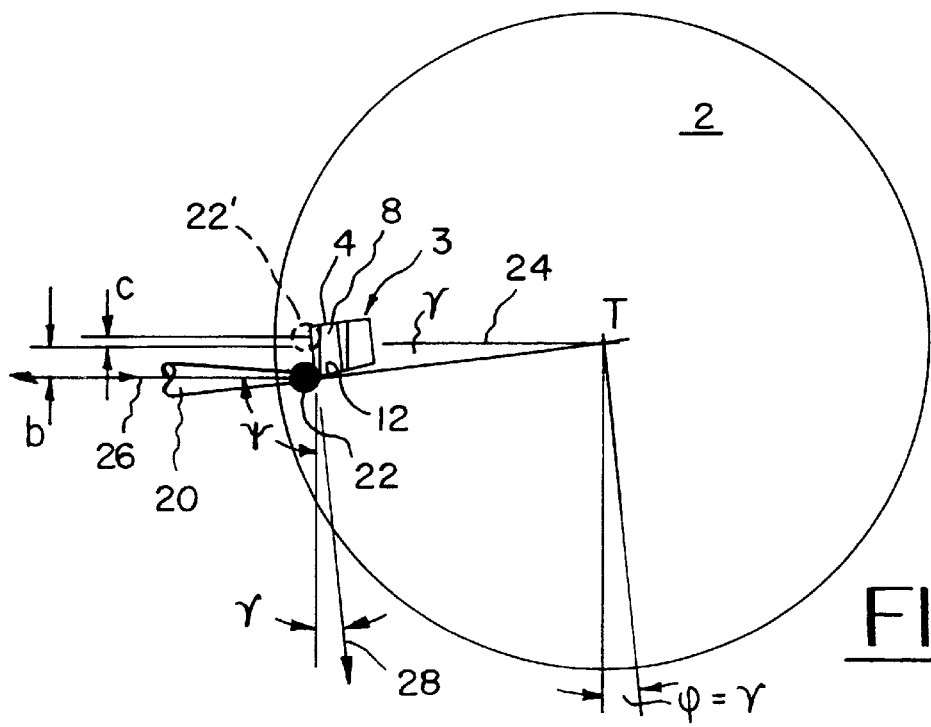
FIG. 5 diagrammatically represents the method of the present invention as applied to a face mill cutter.

FIG. 5 illustrates a front view of cutter head 2 and probe 20 and shows the inventive measuring method for determining the radial position of stick-type cutting blade 3 projecting from the face of a cutter head 2. The inventor has discovered that an additional rotation increment of the cutter beyond that of the prior art methods provides a blade position whereby the inaccurate positioning of the probe ball on the cutting edge of a cutting blade, and hence the inaccurate readings obtained, are essentially eliminated. The inventive method is intended to be carried out on an apparatus capable of performing probe offset and, preferably, blade indexing.

Figure 7:
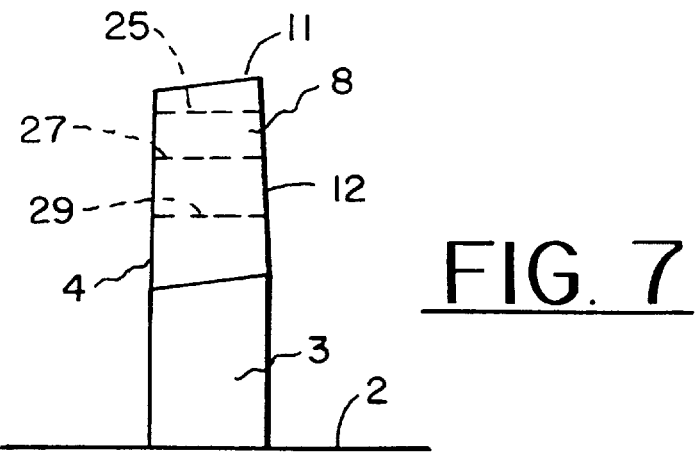
FIG. 7 illustrates a side view of the cutting blade in FIG. 5 or FIG. 6.

In FIG. 5, the cutter 2 is rotated to locate cutting blade 3 in a position wherein the cutting side relief surface 8 is parallel to probe offset travel direction "b". Preferably, in this position, cutting side relief surface 8 is perpendicular to axial plane 24 and to the direction of in/out probe travel 26. This positioning means that probe ball 22 can traverse or contact the side surface 8 at any point along a line of uniform height with respect to the surface of the cutter head 2 (for example, lines 25, 27, or 29 in FIG. 7), with no change in the position reading of the probe 22 along in/out feed direction 26. The lines of uniform height along the length of cutting side surface 8 may also be described as being formed by the intersection of radial planes perpendicular to the tool axis T and the cutting side surface 8.

With the inventive arrangement, it is now possible to determine a cutting blade radial position, which heretofore was obtainable only by contacting the probe directly on the cutting edge, at any location on the cutting side relief surface 8. This inventive method, therefore, eliminates the inaccuracies associated with the prior art necessity of contacting the probe 20 directly on the cutting edge 12 as shown in FIG. 1 and instead provides an entire surface (cutting side relief surface 8) on which probe 20 may contact at any point on the side relief surface 8. This procedure results in a simpler process yielding more accurate and reliable position readings.

For face milling cutter as shown in FIG. 5, the cutter 2 is rotated to a position wherein the instantaneous direction of cutting 28 is perpendicular to the axial plane 24 containing the cutter axis T (as illustrated by FIG. 1). The cutter is then rotated an additional amount φ equal to the angle γ which is the relief angle of the cutting side surface 8 with respect to the instant cutting direction 28. This additional cutter rotation positions the lengthwise direction of cutting side relief surface 8 (from cutting edge 12 to back surface 4) parallel to probe offset travel direction "b" (and "c") and, preferably, perpendicular to in/out probe travel direction 26 (ψ=90 degrees). In this preferred position, the angle between probe in/out travel direction 26 and the instant cutting direction 28 is no longer equal to 90 degrees as in FIG. 1 but is now equal to χ+γ or 90°+γ.

With the inventive method, probe 20 may move in the offset direction (with no appreciable movement in the in/out direction 26) a distance "b" along the cutting side surface 8 from axial plane 24 to cutting edge 12 and may also move a distance "c" along the cutting side surface 8 in the opposite direction from axial plane 24 to the back surface 4 of the cutting blade where the position of the probe ball is illustrated by dashed lines and is referenced by 22'. With this arrangement, the cutting blade may be probed on the cutting side surface 8 any distance away from the cutting edge 12 which makes the inventive arrangement insensitive against misalignment of the probe 20 in the offset direction length of travel "b"+"c" thus increasing the accuracy of measuring. The inventive measuring process also eliminates the need to probe directly on the cutting edge 12 to obtain the radial position measurement as is required in the prior art processes discussed above.

Figure 6:
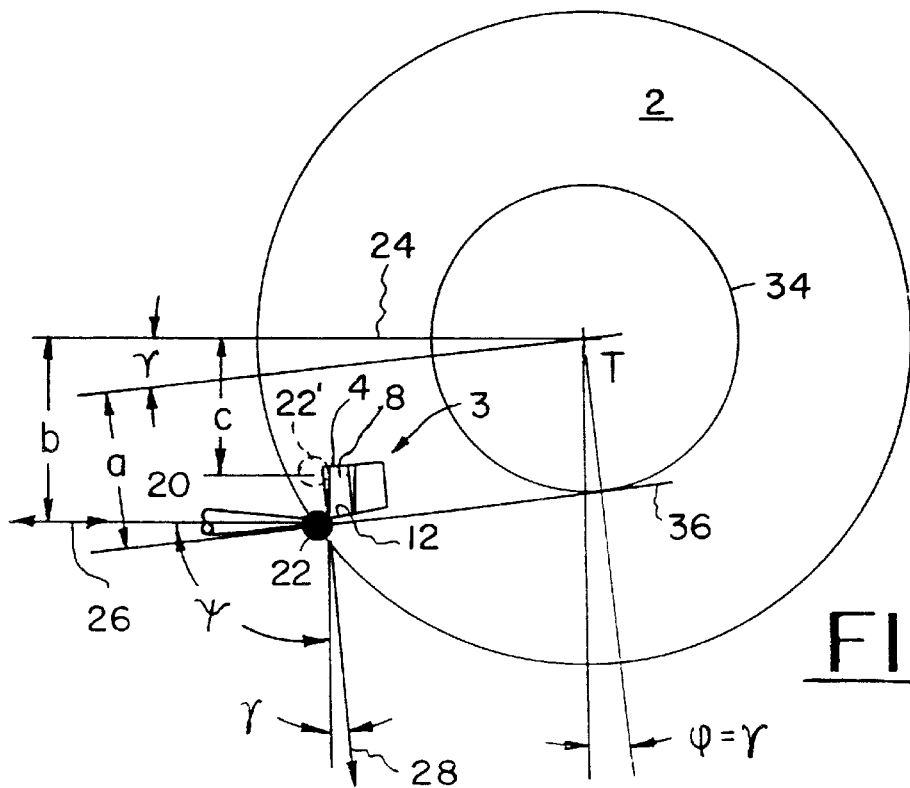
FIG. 6 diagrammatically represents the method of the present invention as applied to a face hob cutter.

The same inventive process may be applied to face hob cutters in a similar manner as is shown in FIG. 6. The face hob cutter is rotated to a position wherein instant cutting direction 28 is perpendicular to the axial plane 24 (FIG. 4) and then rotated an additional rotational increment φ is effected to bring the cutting blade into the position shown in FIG. 6 where the lengthwise direction of cutting side relief surface 8 is parallel to probe offset travel direction "b" and, preferably, perpendicular to in/out probe travel direction 26. As with face mill arrangement of FIG. 5, this additional increment is equal to the cutting side relief angle γ measured between the cutting side relief surface 8 and the instant cutting direction 28.

The cutting side relief surface 8 may be contacted with the probe ball 22 at any point along a line of uniform height with respect to the surface of the cutter head 2 (for example, lines 25, 27, or 29 of FIG. 7) extending from the cutting edge 12 (offset distance "b") to a position 22' at back surface 4 (offset distance "c") and the in/out position of probe 20 (direction 26) will remain essentially the same. Thus, for the face hob cutter of FIG. 6, the inventive arrangement renders probe 20 insensitive against misalignment in the offset direction along the offset length of travel "b"–"c" therefore increasing the accuracy of measuring. The inventive measuring process also eliminates the need to probe directly on the cutting edge 12, as is required in the prior art shown in FIG. 4, to obtain the radial position measurement as is required in the prior art processes discussed above.

It must be noted that although positioning of the cutting blade has been described in terms of rotating the cutting blade to a position wherein the instantaneous direction of cutting 28 is perpendicular to the axial plane 24 and then rotating the cutting blade by an additional amount φ equal to the relief angle of the cutting side surface 8 with respect to the instant cutting direction 28, it is not necessary, nor preferred, that the total angular movement be accomplished in two distinct increments with the rotation stopped between increments. Instead, it is preferred that indexing from one blade to the next be accomplished by one motion to provide the inventive arrangement of the cutting side relief surface 8 being parallel to the direction of probe offset travel.

Figure 8:
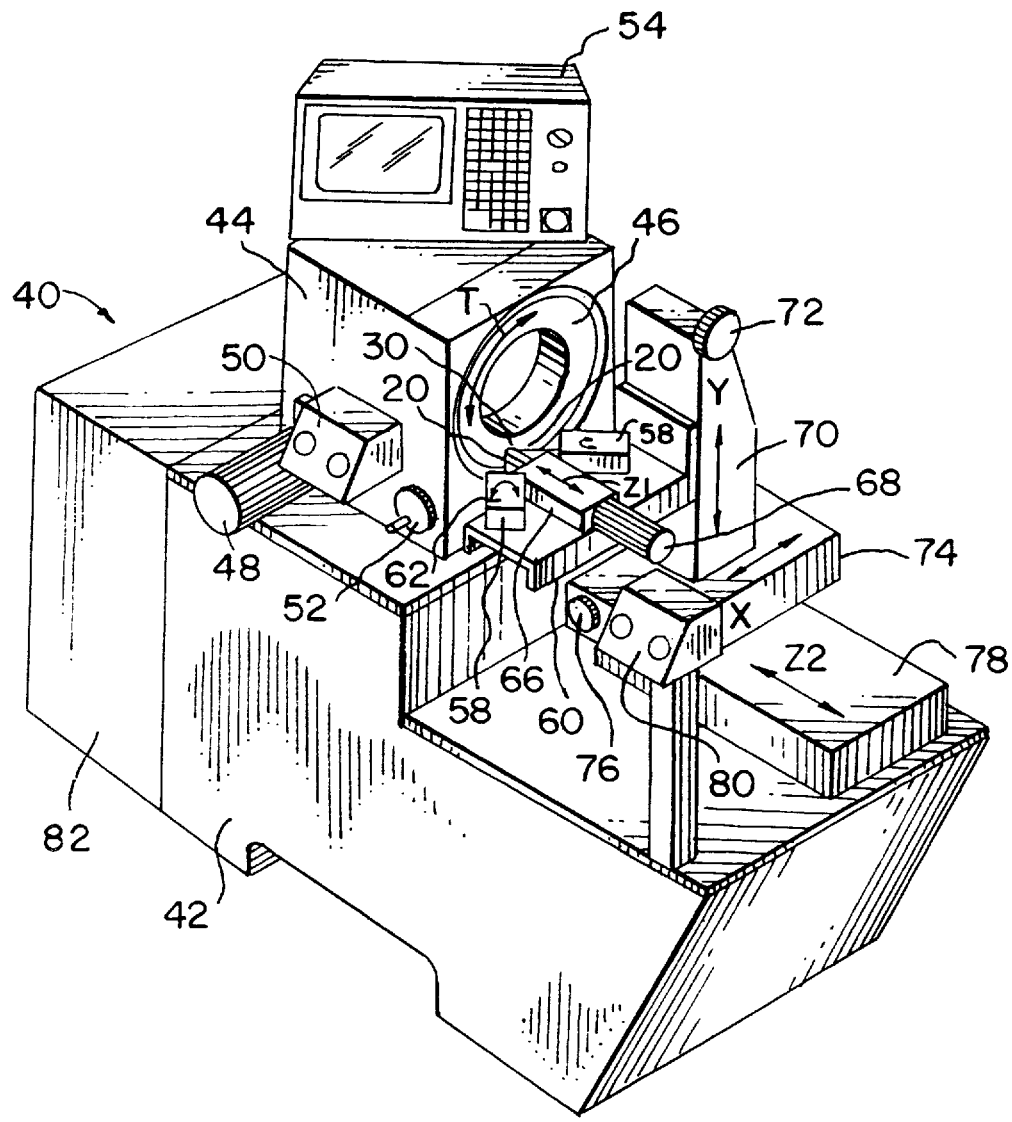
FIG. 8 schematically illustrates an inventive apparatus for carrying out the present inventive process.

FIG. 8 illustrates an inventive truing/measuring apparatus 40 for carrying out the inventive process described above for face mill and/or face hob cutters. The apparatus 40 comprises a machine base 42 on which is mounted a tool spindle housing 44 containing a tool spindle 46 rotatable about a tool axis T. Rotation of tool spindle 46 is effected by a DC servo motor 48 in conjunction with anti-backlash, worm and wheel gearing (not shown). Positioning of the spindle is controlled by an rotary encoder (not shown), for example, a rotary encoder manufactured by Heidenhain Corporation, communicating with the controller in a closed-loop type feedback system. Palm button stations 50 and 80 include cycle start and emergency stop buttons and electronic handwheel 52 provides for rotating tool spindle 46 for setup and adjustment purposes. Control panel 54 comprises a display screen and a keyboard to input information into the machine controller which is any controller (e.g. PC with 386SX-25 mhz CPU, CNC, PLC) capable of multiple axes control. Electrical hardware is housed in electrical power cabinet 82.

Also mounted on machine base 42 is at least one, and preferably two contact measuring probes 20 (one for inside blades and one for outside blades), for example, contact-type measuring probes manufactured by Heidenhain Corporation, to indicate the radial position of the cutting blades. Alternatively, non-contact type probes may also be utilized. The probes are retractable into probe base 58 with the advance motion preferably being spring actuated and the retract motion electrically or vacuum actuated. The advance/retract motion may be controlled by the machine controller. Probes 20 and probe bases 58 are positioned on table 60 and are angularly adjustable (swivel adjustment) thereon as shown by arrow 62. The stop position of the probes may be indicated by any known arrangement such as a readable scale (not shown) located on probe base 58 or an electronic scale with readings being shown on the scale or the display screen.

Table 60 also includes a blade stop 30 and base 66 mounted thereon. Blade stop 30 is linearly movable along an axis Z1 with the movement being effected by a servo motor 68 and the positioning controlled by a linear encoder (not shown), for example, a linear encoder manufactured by Heidenhain Corporation, communicating with the controller in a closed-loop type feedback system. The face of blade stop 30 is essentially flat and preferably comprises carbide material.

The table 60 is linearly movable along column 70 (Y-axis) to vertically position probes 20 and blade stop 30. Movement of table 60 along the Y-axis is effected manually by adjustment handle 72 working through a lead screw and nut or rack and pinion arrangement. Column 70 is positioned on slide 74 and is movable thereon to position probe(s) 20 and blade stop 30 along the width of the machine base 42 (X-axis) with movement being effected manually by adjustment handle 76 working through a lead screw and nut or rack and pinion arrangement. Slide 74 is positioned on slide 78 for advancing/retracting movement of probes 20 and blade stop 30 toward and away from (Z2-axis) the tool spindle 46 to provide the necessary clearance for loading and unloading cutters from tool spindle 46. Movement of slide 74 in the Z2 direction on slide 78 is effected by manually moving slide 74 toward and away from cutter spindle 46 with a stop and locking mechanism (not shown) being included to lock slide 74 in a repeatable advanced working position proximate tool spindle housing 44. Alternatively, movement of slide 74 along the Z2-axis may also be effected manually by an adjustment handle working through a lead screw and nut or rack and pinion arrangement.

The positions of table 60 along the Y-axis and column 70 along the X-axis, and, optionally, slide 74 along the 72-axis, are preferably monitored by readable scales (not shown) located, respectively, on column 70 and slide 74. In alternative embodiments, electronic scales may be utilized to provide position readings for the Y, X, and/or Z axes and display the readings on the display screen, or, encoders and servo motors as part of the closed-loop feedback system may be utilized to monitor and control positions of components along the Y, X, and/or Z2 axes.

In carrying out the inventive process on the machine of FIG. 8, a cutter is mounted to tool spindle 46 and is indexed by turning handwheel 52 to bring a cutting blade (e.g. outside blade) to a position as shown in FIGS. 5 or 6 depending on whether the cutter is a face mill or face hob type. Blade stop 30 is positioned adjacent the cutting blade by advancing slide 74 to the locked position along axis Z2 and moving column 70 and table 60 to appropriate locations along axes X and Y respectively. Blade stop 30 is then set to a master position along axis Z1 and the cutting blade is pushed against stop 30 and clamped in the cutter head 2. The appropriate probe 20 is angularly set by swivel 62 and advanced along direction 26 to contact the cutting side relief surface 8 adjacent the cutting edge 12 and the blade stop 30 is withdrawn. The probe 20 is then traversed along the cutting side surface at a uniform blade height by moving the probe along the Y-axis (offset direction "b", see FIG. 5 or 6).

If the probe position reading changes in the in/out feed direction 26, the probe is withdrawn the rotary position of the cutter 2 is adjusted by turning handwheel 52 and the probing is repeated. When the probe position along direction 26 does not appreciably change upon traversal in the offset direction, the rotary position of the spindle is stored as a master angular reading and the Y-axis position of the probe is set to a predetermined distance (e.g. approximately 0.050 inch (1.27 mm)) from the cutting edge 12 and this offset position is clamped. The master position of a cutting blade is now set.

Alternatively, instead of blade stop 30 being set to a predetermined master position, the blade stop 30 may be brought into contact with a first blade and that position may then be used as a master position for the remaining blades.

Figure 9:
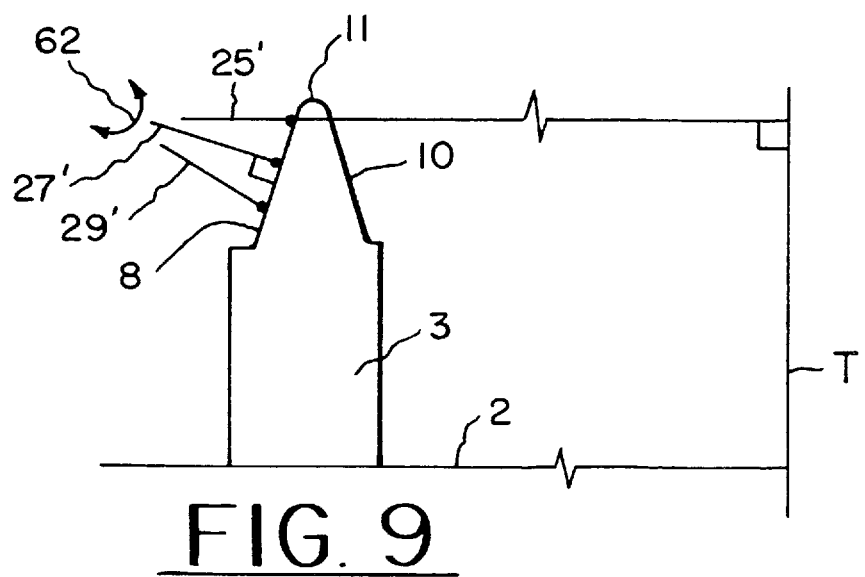
FIG. 9 illustrates a cross-sectional view of the cutting blade of FIGS. 5 or 6 and a plurality of probe orientations.

It should be understood that setting probe 20 by swivel 62 to angularly orient the probe 20 to cutting side surface 8 is preferably carried out so that probe 20 will be oriented essentially perpendicular to the profile direction (pressure angle) of cutting side surface 8 as is shown by probe position 27' in FIG. 9. This particular probe orientation is especially preferred when the probe is of the one-directional type wherein contact is indicated only along one direction of probe movement. The probe 20 of FIGS. 5 or 6 is of the one-directional type which moves in/out along direction 26. With such movement, it is preferred that the probe orientation be perpendicular to the side relief surface 8 since this orientation will yield the most accurate readings. This setting is usually done manually. In this orientation, the probe may contact any point along line 27 (FIG. 7) and retain its perpendicularity with respect to both the lengthwise and profile directions of cutting side surface 8.

In the case of probing with a probe capable of indicating contact by movement in multiple directions (e.g., three-dimensional), it is preferred to orient the probe perpendicular to the orientation of the cutter axis. Such an orientation is illustrated by 25' in FIG. 9. While maintaining its preferred perpendicular relationship (i.e. a radial orientation) with line of contact 25 (FIG. 7), an appropriate multi-directional probe positioned in this manner will provide a true radial reading since the probe will lie in a radial plane with respect to the cutter head.

However, while the above one-directional or multi-directional probing relationships are preferred, a perpendicular orientation between probe 20 and cutting side relief surface 8 or a perpendicular orientation between in/out direction 26 and the cutter axis T is not a requirement of the present invention. The probe 20 may assume any angular relationship with respect to the lengthwise direction and/or the profile direction of cutting side relief surface 8 as long as the cutting side relief surface of the blade is oriented parallel to the direction of probe offset travel and the particular angular relationship is maintained throughout the measuring of all blades of the cutter head. Regardless of the angular orientation of the probe 20 with respect to the side relief surface 8, in/out movement 26 of probe 20 will occur as the probe contacts points along a line of uniform height on relief surface 8 when the relief surface 8 is not parallel to the direction of offset travel "b" (and/or "c"). Once the cutter head is angularly positioned such that cutting blade side relief surface 8 is parallel to the offset travel direction, the only movement noted will be in the direction of the offset travel while the amount of in/out motion 26 of probe 20 will be nil.

As discussed above with respect to either one-dimensional or multi-dimensional probing, it is preferred that the angular relationship between probe 20 and cutting side relief surface 8 be such that the direction of probe in/out travel 26 be perpendicular to the respective uniform-height contact line. In the apparatus of FIG. 8 and as can be seen in FIG. 9, the swivel motion 62 for angularly positioning probe 20 defines a plane which is perpendicular to Y-axis motion (offset travel) and therefore also perpendicular to relief surface 8. Hence, any angular position of a probe in this plane will yield the probe perpendicular to its respective uniform-height line of contact on side relief surface 8. In the most preferred embodiment, one-dimensional probe 20 is oriented perpendicular to the side relief surface 8, (i.e. perpendicular to side relief surface 8 in both lengthwise and profile directions) as was discussed above and shown by 27' in FIG. 9.

The cutter is then indexed to place the next like blade in the previously stored rotary position and the blade is moved against the blade stop 30 which is again set at the master stop position. The cutting blade is clamped in the cutter head and the cutting side relief surface 8 is probed at the same uniform-height and angular positions as the previous blade, to determine the radial position. The results of the measurement include displacements from assembly deformation (torque) and cutting edge displacements caused by cutter head tolerances, blade blank tolerances and blade grinding (sharpening) tolerances.

For situations in which the preferred orientation of the probe is perpendicular to the profile direction of the relief surface 8 (27' of FIG. 9), if the radial reading is outside of a predetermined tolerance from the master blade, a corrective position for the blade stop 30 is calculated according to the equation:

$$\Delta H = \Delta M / \sin \alpha$$

where:
 $\Delta H$=the difference in blade height
 $\Delta M$=difference of probe measurement to master blade
 $\alpha$=blade pressure angle.

For situations in which the preferred orientation of the probe is perpendicular to the direction of the cutter axis T (25' of FIG. 9), if the radial reading is outside of a predetermined tolerance from the master blade, a corrective position for the blade stop 30 is calculated according to the equation:

$$\Delta H = \Delta M / \tan \alpha$$

where:
 $\Delta H$=the difference in blade height
 $\Delta M$=difference of probe measurement to master blade
 $\alpha$=blade pressure angle.

For situations in which the orientation of the probe is in neither of the above-described preferred orientations (such as 29' of FIG. 9), if the radial reading is outside of a predetermined tolerance from the master blade, a corrective position for the blade stop 30 is calculated according to the equation:

$$\Delta H = \frac{\Delta M \times \cos \beta}{\sin \alpha}$$

where:
 $\Delta H$=the difference in blade height
 $\Delta M$=difference of probe measurement to master blade
 $\alpha$=blade pressure angle β=angle between probe feed direction and a line perpendicular to the blade profile (e.g. angle between 29' and 27' of FIG. 9).

The cutting blade is unclamped, the blade stop 30 is moved to the corrected position, and the cutting blade is pushed against the repositioned blade stop (axial movement of the cutting blade to a new blade height) to bring the radial position of the cutting blade to that of the master blade. The newly calculated position takes into consideration the composite of all imprecisions and deflections, mentioned above, caused by torquing the cutting blade in the cutter head. The cutting blade is then clamped in its new position and the cutter is indexed to the next like blade. The process is repeated for all like blades in the cutter head with the radial and axial positions of each blade being stored in the computer. If cutting blades of another type (e.g. inside blades) are positioned in the cutter head, the process of establishing a master blade and measuring/adjusting other like blades as set forth above may also be performed for this set of blades.

Preferably, the repositioning of blade stop 30 comprises withdrawing the blade stop approximately 0.2 inch (5.08 mm) and then moving to the calculated position. This procedure eliminates any effects due to play, stick-slip, and hysteresis which might affect the position of the blade stop if it is moved directly from its initial position to the calculated position.

In some instances, the corrected blade stop position may exceed allowable amount of axial blade movement. For example, axial movement of the cutting blade to achieve a correct radial position may result in the tip of the blade exceeding tolerances with respect to the master position of blade stop 30 thus causing unacceptable tip run-out when cutting. In this circumstance, the controller may limit the amount of change in blade stop positioning to that of permissible axial blade movement, or, the controller may stop the measuring/truing process and signal the operator that the cutter is outside of acceptable tolerances.

Figure 10:
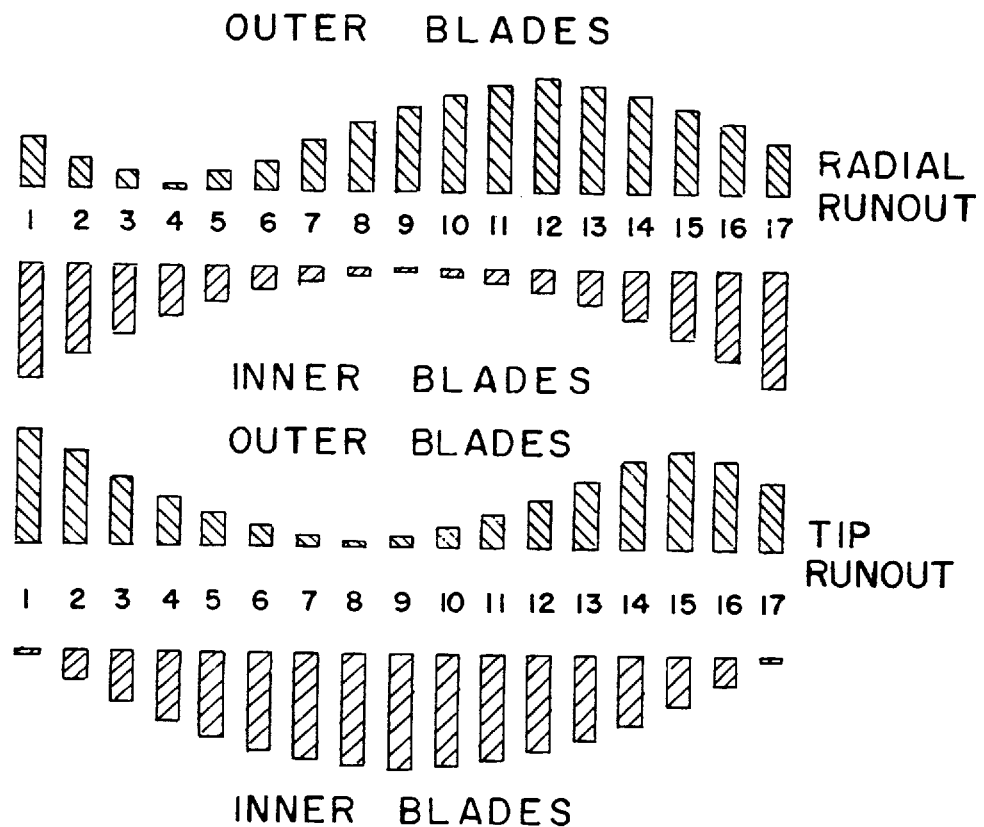
FIG. 10 represents a graphical display of tip and radial run-out measured by the method of the present invention.

After the measuring and truing process is completed, information regarding the repositioning of any or all blades may be displayed and/or printed. For example, it may be calculated and displayed that one outer blade is responsible for 50% of the total cutter radial run-out and the controller may suggest changing the particular blade. If, for example, the same amount of run-out exists after a new blade is inserted, a message to alert the operator that the cutter head itself might be defective may be displayed. If desired, measured radial and tip run-out for all cutting blades may be displayed or printed in graphical form such as shown in FIG. 10 which represents a cutter having seventeen inner and seventeen outer cutting blades.

The method and apparatus of the present invention may also be utilized to investigate cutter heads in other ways. For example, the inventive method may be used a measuring-only procedure to determine the position of blades in a cutter head and provide results such as tip and/or radial run-out. This measuring-only procedure finds use with any cutter but particularly with solid-type cutters in which the cutting blade is integral with and projecting from the cutter head and in which axial positioning of the cutting blades is not possible. The inventive apparatus may also be utilized to as a check of blade geometry such as the pressure angle of the cutting edge. As shown in FIG. 9, the probe may contact the cutting side surface anywhere along its height. This enables probing at points 25' and 29', for example, along the height of surface 8 with the location of these two points being sufficient to determine the pressure angle of the blade which then may be compared to an ideal pressure angle value or to the pressure angles of other blades in the cutter.

The inventive apparatus also enables measuring at the cutting edge or clearance edge and back surface as a check of the relief angles of, respectively, the cutting side relief surface and the clearance side relief surface. While the inventive method has been described with respect to the cutting side relief surface 8, the same procedure may be applied to determine the location of the clearance side relief surface 10 and/or the front rake surface 6. For example, probing along two or more uniform height lines on cutting side relief surface 8 and along two or more lines of the same height on front rake face 6 will enable the positions of the respective cutting side relief plane and front face plane to be identified. With this information, the location of cutting edge 12 can be determined.

The present invention provides a more stable measuring environment than in the prior art. In the prior art, the measuring conditions are very unstable since the surface of the probe ball must contact the cutting edge of a cutting blade. The present invention, however, provides a surface of the cutting side relief surface on which to contact the probe ball. Any point on the cutting side relief surface may be contacted to determine the radial position of the blade. Thus, the unstable surface-to-edge conditions of the prior art had now been replaced with the extremely stable surface-to-surface contact conditions of the present inventive method. With the inventive method, the sensitivity to misalignment of the angular position of the cutter head is also dramatically lower.

The inventive truing and measuring process and apparatus allows assembling a cutter head faster than with the methods of the prior art and cutting blades are trued to a precision not achievable by prior art methods. The present invention depends less on the skill of the operator to provide a precisely trued cutter head than with past methods.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of truing cutting tools of the type comprising a plurality of stick-type cutting blades releasably secured in a cutter head, said cutting blades having a cutting edge and a cutting side relief surface oriented at a relief angle, said method comprising:

providing a truing apparatus comprising a cutting tool spindle and a measuring probe capable of offset movement in a first direction and in/out feed movement in a second direction, mounting said cutting tool to said spindle, positioning said probe with respect to said cutting side relief surface of a cutting blade whereby said cutting side relief surface is substantially parallel to said offset movement in said first direction, probing said cutting side relief surface to provide a position reading, recording the said position reading, comparing said recorded position with a predetermined position, and, (a) if said recorded position is within a pre-set tolerance range of said predetermined position, indexing said cutting tool to another cutting blade, or, (b) if said recorded position is outside of a pre-set tolerance range of said predetermined position, axially adjusting the position of said cutting blade in said cutter head by an amount to reposition said cutting side within said preset tolerance range.

2. The method of claim 1 wherein said probe is a contact-type probe.

3. The method of claim 1 wherein said positioning of said probe includes orienting said probe in/out feed motion perpendicular to the lengthwise direction of said cutting side relief surface.

4. The method of claim 1 wherein said positioning of said probe includes orienting said probe in/out feed motion perpendicular to the profile direction of said cutting side relief surface.

5. The method of claim 1 wherein said probe in/out feed motion is perpendicular to said first direction.

6. The method of claim 1 wherein said spindle is indexable.

7. An apparatus for radially truing cutting tools of the type comprising stick-type cutting blades releasably mounted in a cutter head, said apparatus comprising:
- a machine base,
- a tool support mounted on said machine base, said tool support comprising a tool spindle indexable about a tool axis,
- a probe support mounted on said machine base, said probe support being positionable with respect to said tool support along three mutually orthogonal axes,
- at least one probe mounted to said probe support, said at least one probe being angularly positionable on said probe support and movable in a first direction to define probe offset and in a second direction to define in/out feed motion,
- a blade stop mounted to said probe support, said blade stop being movable toward and away from said tool support along an axis.

8. A method of radially truing cutting tools of the type comprising stick-type cutting blades releasably positioned in a cutter head, said cutting blades having a cutting edge and a cutting side relief surface oriented at a relief angle, said method comprising:
- providing a truing apparatus comprising a measuring probe and a cutting tool spindle,
- mounting said cutting tool to said spindle,
- positioning said probe with respect to said cutting side surface of a cutting blade whereby said probe is adjacent said cutting side surface, said positioning comprising indexing said cutter by an amount to position said cutting edge adjacent said probe plus indexing said cutter by an additional amount equal to said predetermined relief angle to position said probe perpendicular to the lengthwise direction of said cutting side relief surface,
- probing said cutting side relief surface to determine a position reading,
- recording said position reading,
- comparing said recorded position with a predetermined position, and,
  - (a) if said recorded position is within a pre-set tolerance range of said predetermined position,
    - indexing said cutting tool to another cutting blade, or,
  - (b) if said recorded position is outside of a pre-set tolerance range of said predetermined position,
    - axially adjusting the position of said cutting blade in said cutter head by an amount to reposition said cutting side within said preset tolerance range.

9. A method of determining the position of at least one surface of a stick-type cutting blade projecting from a surface of a cutter head, said at least one cutting blade having a cutting edge, a cutting side relief surface oriented at a first relief angle, a clearance side relief surface oriented at a second relief angle, and a front rake face oriented at a rake angle, said method comprising:
- providing an apparatus comprising a cutter spindle and a measuring probe capable of movement in a first direction defining probe offset travel,
- mounting said cutter head to said spindle,
- positioning said probe with respect to a surface of said cutting blade whereby said surface is substantially parallel to said first direction,
- probing said surface to determine a position reading,
- recording the position of said surface.

10. The method of claim 9 wherein said surface comprises a cutting side relief surface.

11. The method of claim 9 wherein said cutter head and said at least one cutting blade comprise a solid-type cutter.

* * * * *